United States Patent
Da Palma et al.

(10) Patent No.: US 8,032,379 B2
(45) Date of Patent: *Oct. 4, 2011

(54) CREATING AND EDITING WEB 2.0 ENTRIES INCLUDING VOICE ENABLED ONES USING A VOICE ONLY INTERFACE

(75) Inventors: William V. Da Palma, Coconut Creek, FL (US); Victor S. Moore, Lake City, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1048 days.

This patent is subject to a terminal disclaimer.

(21) Appl. No.: 11/766,210

(22) Filed: Jun. 21, 2007

(65) Prior Publication Data

US 2008/0319760 A1    Dec. 25, 2008

Related U.S. Application Data

(63) Continuation-in-part of application No. 11/765,900, filed on Jun. 20, 2007, which is a continuation-in-part of application No. 11/765,928, filed on Jun. 20, 2007, which is a continuation-in-part of application No. 11/765,962, filed on Jun. 20, 2007.

(51) Int. Cl.
*G10L 21/00* (2006.01)
(52) U.S. Cl. .................. 704/270.1; 715/201; 709/226
(58) Field of Classification Search .......... 704/270, 704/270.1; 715/201, 234, 700, 738; 709/226
See application file for complete search history.

(56) References Cited

U.S. PATENT DOCUMENTS

| | | | |
|---|---|---|---|
| 6,314,402 B1 | 11/2001 | Monaco et al. | |
| 6,324,511 B1 | 11/2001 | Kiraly et al. | |
| 6,442,577 B1 | 8/2002 | Britton et al. | |

(Continued)

FOREIGN PATENT DOCUMENTS

WO    2005011921    12/2005

OTHER PUBLICATIONS

Takami et al.; A study on the architecture and voice dialog scheme for a personal Web service in a ubiquitous communication environment; IEEE, Jun. 2006, pp. 398-401.*

(Continued)

*Primary Examiner* — Abul K Azad
(74) *Attorney, Agent, or Firm* — Patents on Demand, P.A.; Brian K. Buchheit; Scott M. Garrett

(57) ABSTRACT

The present invention discloses a method for creating Web 2.0 entries, such as WIKI entries. In the method, a voice communication channel can be established between a user and an automated response system. User speech input can be received over the voice communication channel. A Web 2.0 entry can be created based upon the speech input. The Web 2.0 entry can be saved in a data store accessible by a Web 2.0 server. The Web 2.0 server can serve the saved Web 2.0 entry to Web 2.0 clients. The Web 2.0 clients can include a graphical and/or a voice interface through which the Web 2.0 entry can be presented to users of the clients. The created Web 2.0 entries (e.g. Web 2.0 application) can be formatted in an ATOM PUBLISHING PROTOCOL compliant manner.

16 Claims, 3 Drawing Sheets

U.S. PATENT DOCUMENTS

| | | | |
|---|---|---|---|
| 6,636,831 B1 | 10/2003 | Profit, Jr. et al. | |
| 6,801,604 B2 | 10/2004 | Maes et al. | |
| 6,865,599 B2 | 3/2005 | Zhang | |
| 7,143,148 B1 | 11/2006 | Hickman et al. | |
| 7,334,050 B2 | 2/2008 | Zondervan et al. | |
| 7,581,166 B2* | 8/2009 | Renger et al. | 715/201 |
| 7,631,104 B2* | 12/2009 | Da Palma et al. | 709/246 |
| 7,673,017 B2 | 3/2010 | Kim et al. | |
| 2002/0010756 A1 | 1/2002 | Oku | |
| 2002/0052747 A1* | 5/2002 | Sarukkai | 704/270 |
| 2003/0055884 A1 | 3/2003 | Yuen et al. | |
| 2003/0088421 A1 | 5/2003 | Maes et al. | |
| 2003/0139928 A1 | 7/2003 | Krupatkin et al. | |
| 2003/0177010 A1 | 9/2003 | Locke | |
| 2005/0132056 A1 | 6/2005 | Creamer et al. | |
| 2006/0004700 A1 | 1/2006 | Hofmann et al. | |
| 2006/0015335 A1 | 1/2006 | Vennelakanti et al. | |
| 2006/0195328 A1 | 8/2006 | Abraham et al. | |
| 2007/0078884 A1* | 4/2007 | Ott et al. | 707/102 |
| 2008/0034056 A1* | 2/2008 | Renger et al. | 709/217 |
| 2008/0086689 A1* | 4/2008 | Berkley et al. | 715/731 |
| 2008/0242221 A1 | 10/2008 | Shapiro et al. | |
| 2008/0319742 A1 | 12/2008 | Da Palma et al. | |
| 2008/0319757 A1 | 12/2008 | Da Palma et al. | |
| 2008/0319758 A1 | 12/2008 | Da Palma et al. | |
| 2008/0319759 A1 | 12/2008 | Da Palma et al. | |
| 2008/0319761 A1 | 12/2008 | Da Palma et al. | |
| 2008/0319762 A1 | 12/2008 | Da Palma et al. | |
| 2008/0320079 A1 | 12/2008 | Da Palma et al. | |
| 2008/0320443 A1 | 12/2008 | Da Palma et al. | |

OTHER PUBLICATIONS

Huang, C.M., et al., "Phone-Web: Accessing WWW using a telephone set", World Wide Web, vol. 2, No. 3, pp. 161-178, 1999.

Freier, J., et al., "WebViews: Accessing Personalized Web Content and Services", Proc. of 10th Int'l Conf. on WWW, Hong Kong, pp. 576-586, 2001.

Goose, S., et al., "Streaming speech3: a framework for generating and streaming 3D text-to-speech and audio presentations to wireless PDAs as specified using extensions to SMIL", Proc. of 11th Int'l. Conf. on WWW, Honolulu, HI, pp. 37-44, 2002.

Jieun, P., et al., "Conversational browser for accessing VoiceXML-based IVR services via multi-modal interactions on mobile devices", WSEAS Trans. on Computers, vol. 3, No. 1, pp. 85-91, Jan. 2004.

Capra III, R.G., et al., "Mobile refinding of web information using a voice interface: an exploratory study", Proc. of 2005 Latin American Conf. on Human-computer interaction, Cuernavaca, Mexico, pp. 88-99, 2005.

Chang, S.E., et al., "The implementation of a secure and pervasive multimodal Web system architecture", Inf. and Software Tech., vol. 48, No. 6, pp. 424-432, Jun. 2006.

Fielding, R., et al., "Hypertext Transfer Protocol—HTTP/1.1," [online] Internet RFC 2616, The Internet Society, 1999, [retrieved Jul. 22, 2009] retrieved from the Internet: <http://www.w3.org/Protocols/rfc2616/rfc2616.html>.

O'Reilly, T., "What is Web 2.0," [online] O'Reilly Network, Sep. 30, 2005, [retrieved Nov. 25, 2008] retrieved from the Internet <http://www.oreillynet.com/pub/a/oreilly/tim/news/2005/09/30/what-is-web-20.html>.

"BLIKI", [online] Wikipedia [retrieved Feb. 23, 2007] retrieved from the Internet: <http://en.wikipedia.org/wiki/Bliki>.

"Cyn.in," [online] Cynapse [retrieved Feb. 23, 2007] retrieved from the Internet: <http://www.cynapse.com/cynin>.

DeMaria, M.J., "Searching for the Right Words", Network Computing, vol. 17, No. 22, pp. 26, 28, Oct. 26, 2006.

"Enterprise Bliki," [online] Wikipedia, [retrieved Feb. 23, 2007] retrieved from the Internet: http://en.wikipedia.org/wiki/Enterprise_bliki>.

Fielding, R., et al., "Principled Design of the Modern Web Architecture," ACM Trans. on Internet Technology, vol. 2, No. 2, May 2002, pp. 115-150.

Kolias, et al., "A Pervasive Wiki Application Based on VoiceXML," ACM, PETRA '08, Jul. 15-19, 2008.

Leseney, T., "Push-to-blog", Siemens AG, Oct. 2004.

Nottingham, M., et al., "Request for Comments (RFC) 4287: The Atom Syndication Format," The Internet Society, Dec. 2005, 43 pages.

Schaffert, et al., "IkeWiki: A Semantic Wiki for Collaborative Knowledge Management,"IEEE Int'l. Workshops on Enabling Technologies: Infrastructure for Collaborative Enterprises, 2006.

"SuiteTwo: Features", [online] Moveable Type, 2006 [retrieved Feb. 23, 2007] retrieved from the Internet: < http://suitetwo.com/features>.

"Wiki," [online] Wikipedia [retrieved Feb. 23, 2007] retrieved from the Internet: <http://en.wikipedia.org/wiki/Wiki>.

US Patent No. 7631104, Notice of Allowance, Jul. 29, 2009.

US Pub. No. 20080319758, Office Action 1, Jun. 9, 2010.

US Pub. No. 20080319762, Office Action 1, Jun. 11, 2010.

US Pub. No. 20080320079, Office Action 1, Jun. 30, 2010.

* cited by examiner

CREATING AND EDITING WEB 2.0 ENTRIES INCLUDING VOICE ENABLED ONES USING A VOICE ONLY INTERFACE

CROSS-REFERENCE TO RELATED APPLICATIONS

This continuation-in-part application claims the benefit of U.S. patent application Ser. No. 11/765,900 filed Jun. 20, 2007, the benefit of U.S. patent application Ser. No. 11/765,928 filed Jun. 20, 2007, and the benefit of U.S. patent application Ser. No. 11/765,962 filed Jun. 20, 2007, which are incorporated by reference herein.

BACKGROUND

1. Field of the Invention

The present invention relates to the field of Web 2.0 software development tools and, more particularly, to creating and editing Web 2.0 entries using a voice only interface.

2. Description of the Related Art

Web 2.0 refers to a cooperative Web in which end-users add value by providing content, as opposed to Web systems that unidirectionally provide information from an information provider to an information consumer. In other words, Web 2.0 refers to a readable, writable, and updateable Web. While a myriad of types of Web 2.0 applications exists, some currently popular ones include WIKIs, BLOGs, MASHUPs, FOLKSONOMIEs, social networking sites, and the like.

Currently Web 2.0 users are restricted to using Graphical User Interface (GUI) based editors to create and edit content. For example, WIKI content providers can utilize a WIKI editor from a Web browser to add WIKI entries written in a WIKI syntax. The visual modality restriction makes it difficult, if not impossible, for visually impaired individuals to create and modify Web 2.0 content without assistance. It also restricts interactive options of sighted users, such as a BLOG creator who could desire to update/create BLOG entries via a telephone interface.

In general, Web 2.0 applications do not incorporate speech processing technologies. Such technologies can require a Web 2.0 server to be integrated with a server-side speech processing system. Traditional interface mechanisms to these speech processing systems rely upon specialized voice toolkits, such as IBM's WEBSPHERE VOICE SERVER (WVS) voice toolkit. Use of these toolkits requires some knowledge of speech processing technologies that is beyond a proficiency of most end-users and even many programmers. Since end-users are content providers of Web 2.0 applications, this effectively prevents Web 2.0 applications from utilizing speech processing technologies. It further prevents voice only interfaces, which are typically more restricted than graphical ones, from being used to create speech-enabled applications.

SUMMARY OF THE INVENTION

The present invention discloses a software development tool that allows users to create and edit Web 2.0 entries, such as WIKI entries, utilizing a voice-only interface. The Web 2.0 entries can be speech-enabled entries written to conform to an ATOM PUBLISHING PROTOCOL (APP) format. In one configuration of the invention, users can be permitted to create and edit voice applications over a telephone. Appreciably, an end-user of the inventive software development tool is not required to establish a complex client-side interface with a server-side speech processing system. Instead, a new speech processing system interface is created that utilizes a set of constrained commands using Representational State Transfer architecture (REST) commands (e.g., GET, PUT, POST, and DELETE commands) to interface with speech engines using standard Web 2.0 protocols.

In one embodiment of the invention, the software development tool accessible via a voice response interface can prompt a user in a well-defined manner by asking a finite set of questions. For example, the tool can prompt a user to speak a text-to-speech (TTS) prompt that is desired, a name of a grammar to be used to process prompt responses, actions to take depending upon recognition results, and any other desired parameters. The user input can be converted into Web 2.0 entries, which are executable by a Web 2.0 server. The created Web 2.0 entries can be served to clients having a Voice User Interface (VUI) as well as clients having a Graphical User Interface (GUI).

The present invention can be implemented in accordance with numerous aspects consistent with the material presented herein. For example, one aspect of the present invention can include a method for creating Web 2.0 entries, such as WIKI entries. In the method, a voice communication channel can be established between a user and an automated response system. User speech input can be received over the voice communication channel. A Web 2.0 entry can be created based upon the speech input. The Web 2.0 entry can be saved in a data store accessible by a Web 2.0 server. The Web 2.0 server can serve the saved Web 2.0 entry to Web 2.0 clients. The Web 20 clients can include a graphical and/or a voice interface through which the Web 2.0 entry can be presented to users of the clients.

Another aspect of the present invention can include a system for creating Web 2.0 applications via a voice only interface that includes a Web 2.0 server, an automated response system, and an application development component. The Web 2.0 server, which can be a WIKI server, can serve applications to remotely located clients. Each of the applications can include an introspection document, an entry collection of linked entries, and a resource collection of resources. The automated response can interact with remotely located users over a voice communication channel. The application development component can be communicatively linked to the automated response system and configured to receive speech input from users over the voice communication channel. The application development component can create content contained within entries of the entry collection based upon the received speech input. That is, the entries created via the application development component can be served by the Web 2.0 server.

Still another aspect of the present invention can include a method for creating and editing Web 2.0 applications using a voice user interface. In the method, a user can connect to a voice response system over a voice communication channel. The voice response system can be linked to a data store containing a set of speech-enabled Web 2.0 applications. Each of the speech-enabled Web 2.0 applications can include an introspection document, a collection of entries, and a collection of resources. A Web 2.0 server can serve the speech-enabled Web 2.0 applications to remotely located clients. Speech input can be received over the voice communication channel, which can be speech recognized. The speech recognized input can be processed to create and/or edit one of the entries in the collection of entries. In one configuration, end users can be able to introspect, customize, replace, add, re-order, and remove entries and resources in the collections through either a GUI editor or through the voice user interface of the method.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
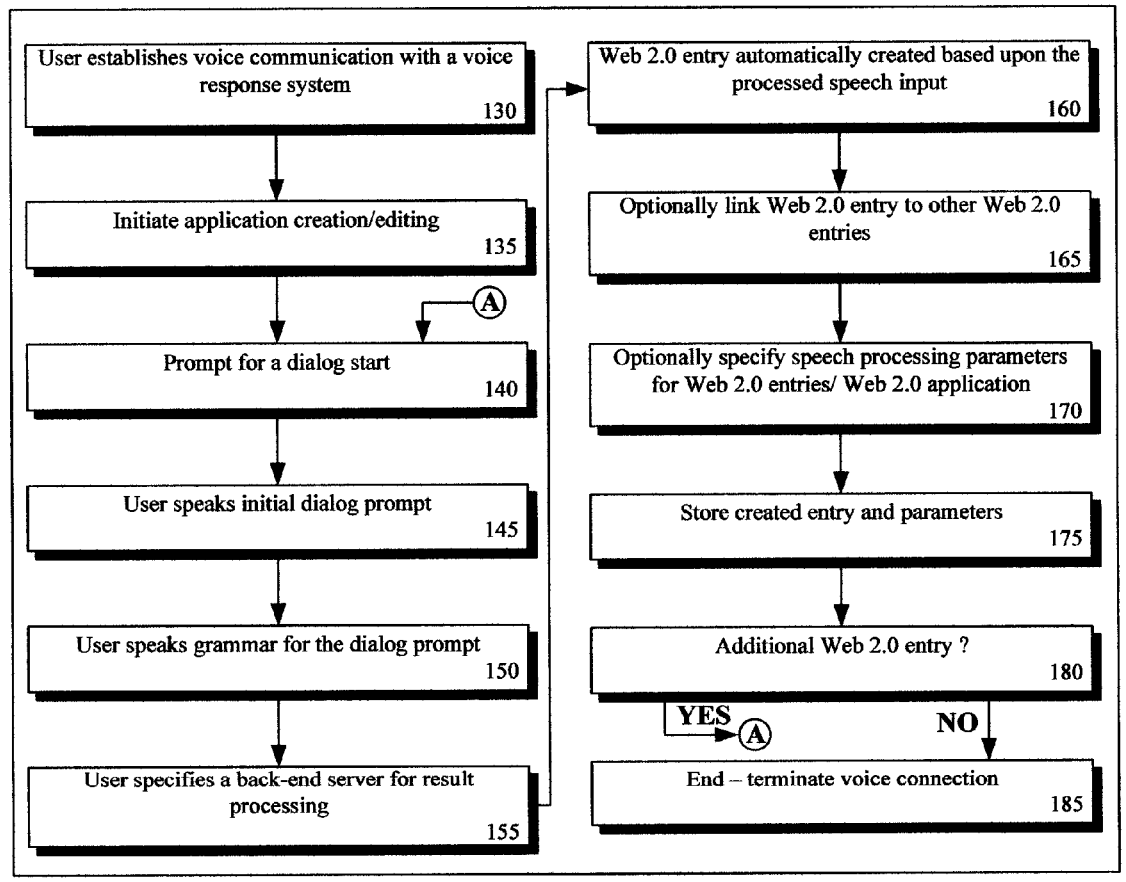
FIG. 1 is a flow diagram illustrating a voice only interface for creating and editing Web 2.0 applications in accordance with an embodiment of the inventive arrangements disclosed herein.

FIG. 1 is a flow diagram illustrating a voice only interface 112 for creating and editing Web 2.0 applications in accordance with an embodiment of the inventive arrangements disclosed herein. In illustrated environment 105, an end-user 110 can use the voice only interface 112 to interact with a voice response system 113, which is linked to a Web 2.0 server 114 and a voice editor 116. The voice editor 116 can create Web 2.0 applications 115, which can be speech-enabled applications. The voice editor 116 can include an optional sandbox 117, which can be an isolated computing space within which users 110 can create/edit/test applications 115 in a non-published or non-live computing space. Applications 115 created and/or edited by the voice editor 116 can be stored in a data store accessible by the Web 2.0 server 114. The Web 2.0 server 114 can then serve the applications 114 to clients. Speech engines of speech system 118 can be utilized to perform speech processing tasks for speech-enabled ones of the applications 115.

Each application 115 can be associated with an introspection document and a collection of entries and resources. The resources can link a Web 2.0 server 114 to speech processing engines of speech system 118. End-users 110 of environment 105 can be permitted to introspect, customize, add, re-order, and remove entries and resources of the collections via the voice only interface 112. In one embodiment, applications and resources can also be created/modified by a graphical editor (not shown) of the Web 2.0 server 114. In one embodiment, the application 115 can be written in accordance with Representational State Transfer architecture (REST) principles. For example, the application 115 can conform to the ATOM PUBLISHING PROTOCOL (APP).

The voice response system 113 can be an automated system that permits users 110 to interact with applications 115 through a voice communication channel. The voice response system 113 can incorporate telephone technologies to permit callers 110 to receive speech output and to present speech and/or Dual Tone Multi-Frequency (DTMF) dial pad input. The voice response system 113 can provide dialog prompts, each associated with a constrained grammar or a set of acceptable responses. These responses can, in turn, be mapped to programmatic actions which are selectively triggered based upon user responses to the prompts. In one embodiment, the applications 115 can be written in VoiceXML or other voice markup language, which is interpreted by a VoiceXML interpreter included within or accessed by the voice response system 113.

The voice editor 116 can utilize a set of well-defined commands to create application 115 using a finite set of questions. For example, the voice editor 116 can prompt a user to speak a desired TTS prompt, a name of a grammar for the TTS prompt, and actions to be taken with the recognition results. This prompting can repeat for each "turn" in the application 115. In one embodiment, end-users 110 can customize behavior of the voice editor 116 to use different user 110 specific defaults and/or different types of prompting.

In another embodiment, the editor 116 can utilize sets of generic templates for different types of applications. These templates can be customized and extended. For example, a template for a survey can be used to quickly generate a speech-enabled telephone survey application by having a user 110 (e.g., application developer) fill-in details of a partially filled survey application template. In another example, a customer service template can include a previously configured set of dialog templates, which a user 110 (e.g., application developer) edits using editor 116 to create a customized customer service application.

The Web 2.0 server can be a WIKI server, a BLOG server, MASHUP server, a FOLKSONOMY server, a social networking server, and the like. A speech system 118 can include speech processing engines which can be accessed by the server 114 through use of a set of RESTful commands. Further, the speech system 118 can be part of a turn-based network system, such as the WEBSPHERE VOICE SERVER. The RESTful commands can include GET, PUT, POST, and/or DELETE commands. There are no assumptions regarding the Web 2.0 clients to which the applications 115 are served other than an ability to communicate with a Web 2.0 server 114.

The speech system 118 can be a network accessible system of speech processing resources. The system 118 can be a turn-based speech system, which provides speech recognition, speech synthesis, speaker identification and verification, and other speech processing services. In one embodiment, the speech system 118 can be an implementation of IBM's WEBSPHERE VOICE SERVER, although the invention is not limited in this regard.

The method of FIG. 1, which includes steps 130-185, can be performed in the context of environment 105. The method can begin in step 130, where a user establishes a voice communication channel with a voice response system. In step 135, an application creation/editing tool of a voice editor can be initiated. In step 140, the tool can prompt the user for a dialog start. In step 145, the user can speak input that defines an initial dialog prompt. This input can be speech-to-text converted by the voice editor and added to markup code for the application entry being created by the user. This markup code can include VoiceXML markup. In step 150, a user can then speak grammar to be used for the dialog prompt. An existing grammar can be specified by the user at this stage, or the user can enumerate a set of valid entries for a new grammar. A speech recognition grammar that corresponds to the new dialog prompt can be established by processing user provided input from step 150.

In step 155, the user can specify a back-end server that is to process responses provided to the dialog prompt 155. In step 160, a Web 2.0 entry can be automatically created based upon the processed speech input. This Web 2.0 entry can include VoiceXML written code and can be formatted to conform to an APP compliant protocol. In step 165, the new Web 2.0 entry can be optionally linked to other Web 2.0 entries, which together form a Web 2.0 application. In step 170, speech processing parameters can be optionally specified for the Web 2.0 entries. When no speech processing parameters are specified in step 170, defaults can be utilized. In step 175, the newly created Web 2.0 entry and associated parameters can be stored in a memory space accessible by a Web 2.0 server. A determination as to whether additional Web 2.0 entries are to be manipulated and/or created can be made in step 180. If new entries are to be created, the method can loop from step 180 to step 140, where a user can be prompted for new dialog specifying input. When no other entries are to be created, the method can proceed from step 180 to step 185, where the application development tool can be exited and where the voice connection with the voice response system can be terminated.

To illustrate a use of FIG. 1, a user 110 can access the voice editor 116 to create a WIKI entry. Upon establishing a communication connection, the user 110 can be initially informed that they are building their first WIKI page. When prompted, the user 110 can speak a welcome/authentication prompt, such as "Welcome to Acme banking .... Please enter your account number and PIN." The user can then be prompted for a grammar to use for the welcome/authentication prompt. The user can specify a pre-built grammar which corresponds to a properly formatted account number and PIN input. The user can then specify a link to a back-end server for handling a properly entered account number and PIN. A format of input/output to the back-end server can be provided at this time. Speech processing for this interaction can be handled by speech system 118, which also handles speech processing operations for completed applications 115. The process can be repeated for additional WIKI pages until the WIKI application is finished. Links can be established between different WIKI pages and data values, such as account number, can be conveyed across these links. A user 110 (i.e. application developer) can be permitted to configure speech system 118 specific parameters, such as TTS voice, speaking rate, ASR thresholds, and the like, for the new application 115 using the voice editor 116. A finished WIKI application 115 can be stored and thereafter served to WIKI clients by server 114.

Figure 2:
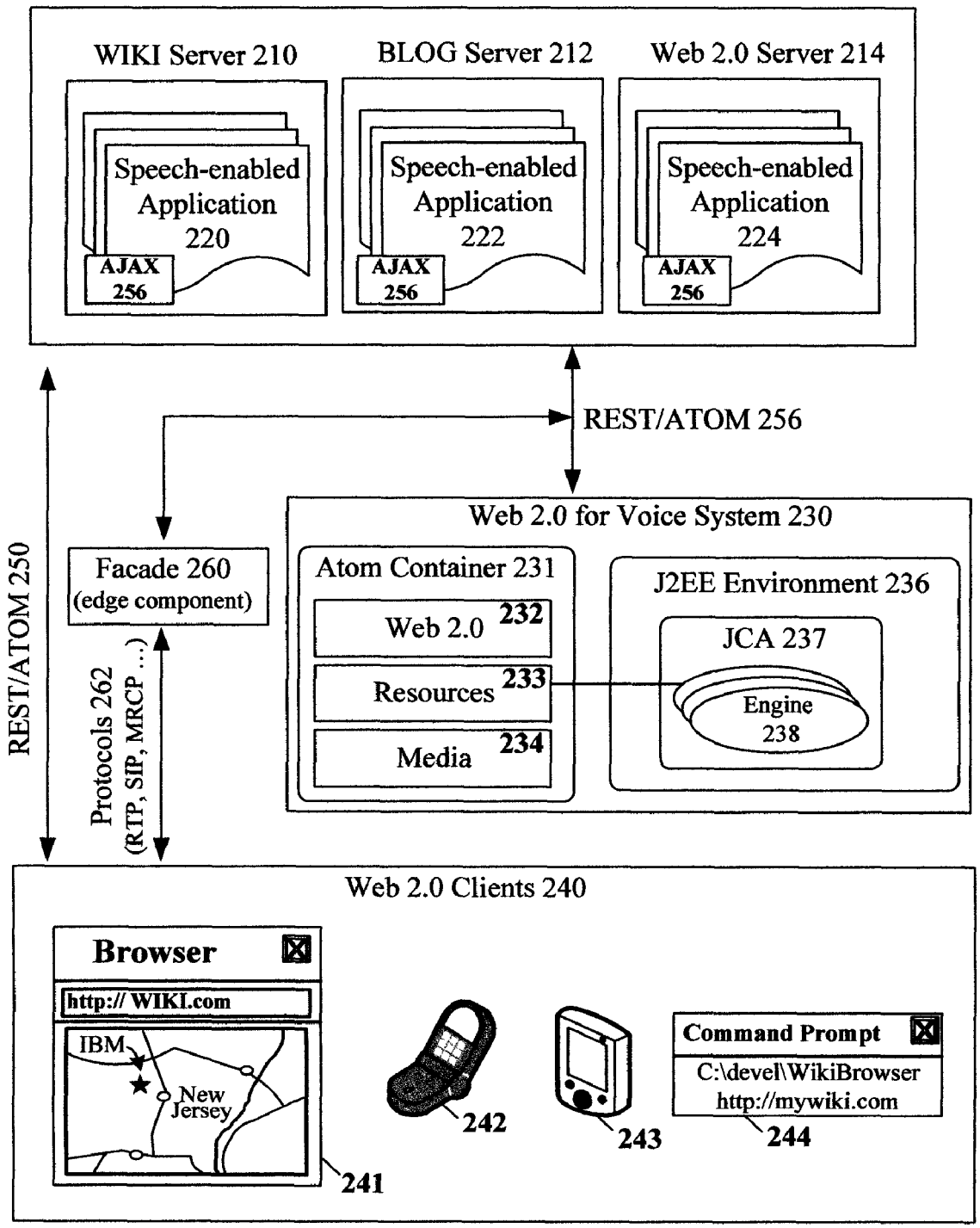
FIG. 2 is a schematic diagram of a Web 2.0 server that serves Web 2.0 applications, such as those created via a voice only interface, in accordance with an embodiment of the inventive arrangements disclosed herein.

FIG. 2 is a schematic diagram of a system 200 for a Web 2.0 server 210-214 that serves Web 2.0 applications such as those created via a voice only interface in accordance with an embodiment of the inventive arrangements disclosed herein. That is, the Web 2.0 server 114 of environment 105 can be any of the Web 2.0 servers 210-214, which utilize the Web 2.0 for voice system 230 for providing speech processing capabilities of served speech-enabled applications 220-224. The applications 220-224 need not be speech-enabled, however, and the system 200 and voice-only interface 112 can be used to create any Web 2.0 application, speech-enabled or not.

In system 200, Web 2.0 clients 240 can communicate with Web 2.0 servers 210-214 utilizing a REST/ATOM 250 protocol. The Web 2.0 servers 210-214 can serve one or more speech-enabled applications 220-224, where speech resources are provided by a Web 2.0 for Voice system 230. One or more of the applications 220-224 can include AJAX 256 or other JavaScript code. In one embodiment, the AJAX 256 code can be automatically converted from WIKI or other syntax by a transformer of a server 210-214.

Communications between the Web 2.0 servers 210-214 and system 230 can be in accordance with REST/ATOM 256 protocols. Each speech-enabled application 220-224 can be associated with an ATOM container 231, which specifies Web 2.0 items 232, resources 233, and media 234. One or more resource 233 can correspond to a speech engine 238.

The Web 2.0 clients 240 can be any client capable of interfacing with a Web 2.0 server 210-214. For example, the clients 240 can include a Web or voice browser 241 as well as any other type of interface 244, which executes upon a computing device. The computing device can include a mobile telephone 242, a mobile computer 243, a laptop, a media player, a desktop computer, a two-way radio, a line-based phone, and the like. Unlike conventional speech clients, the clients 240 need not have a speech-specific interface and instead only require a standard Web 2.0 interface. That is, there are no assumptions regarding the client 240 other than an ability to communicate with a Web 2.0 server 210-214 using Web 2.0 conventions.

The Web 2.0 servers 210-214 can be any server that provides Web 2.0 content to clients 240 and that provides speech processing capabilities through the Web 2.0 for voice system 230. The Web 2.0 servers can include a WIKI server 210, a BLOG server 212, a MASHUP server, a FOLKSONOMY server, a social networking server, and any other Web 2.0 server 214.

The Web 2.0 for voice system 230 can utilize Web 2.0 concepts to provide speech capabilities. A server-side interface is established between the voice system 230 and a set of Web 2.0 servers 210-214. Available speech resources can be introspected and discovered via introspection documents, which are one of the Web 2.0 items 232. Introspection can be in accordance with the APP specification or a similar protocol. The ability for dynamic configuration and installation is exposed to the servers 210-214 via the introspection document.

That is, access to Web 2.0 for voice system 230 can be through a Web 2.0 server that lets users (e.g., clients 240) provide their own customizations/personalizations. Appreciably, use of the APP 256 opens up the application interface to speech resources using Web 2.0, JAVA 2 ENTERPRISE EDITION (J2EE), WEBSPHERE APPLICATION SERVER (WAS), and other conventions, rather than being restricted to protocols, such as media resource control protocol (MRCP), real time streaming protocol (RTSP), or real time protocol (RTP).

A constrained set of RESTful commands can be used to interface with the Web 2.0 for voice system 230. RESTful commands can include a GET command, a POST command, a PUT command, and a DELETE command, each of which is able to be implemented as an HTTP command. As applied to speech, GET (e.g., HTTP GET) can return capabilities and elements that are modifiable. The GET command can also be used for submitting simplistic speech queries and for receiving query results.

The POST command can create media-related resources using speech engines 238. For example, the POST command can create an audio "file" from input text using a text-tospeech (TTS) resource 233 which is linked to a TTS engine 238. The POST command can create a text representation given an audio input, using an automatic speech recognition (ASR) resource 233 which is linked to an ASR engine 238. The POST command can create a score given an audio input, using a Speaker Identification and Verification (SIV) resource which is linked to a SIV engine 238. Any type of speech processing resource can be similarly accessed using the POST command.

The PUT command can be used to update configuration of speech resources (e.g., default voice-name, ASR or TTS language, TTS voice, media destination, media delivery type, etc.) The PUT command can also be used to add a resource or capability to a Web 2.0 server 210-214 (e.g. installing an SIV component). The DELETE command can remove a speech resource from a configuration. For example, the DELETE command can be used to uninstall a previously installed speech component.

The Web 2.0 for Voice system 230 is an extremely flexible solution that permits users (of clients 240) to customize numerous speech processing elements. Customizable speech processing elements can include speech resource availability, request characteristics, result characteristics, media characteristics, and the like. Speech resource availability can indicate whether a specific type of resource (e.g., ASR, TTS, SIV, Voice XML interpreter) is available. Request characteristics can refer to characteristics such as language, grammar, voice attributes, gender, rate of speech, and the like. The result characteristics can specify whether results are to be delivered synchronously or asynchronously. Result characteristics can alternatively indicate whether a listener for callback is to be supplied with results. Media characteristics can include input and output characteristics, which can vary from a URI reference to an RTP stream. The media characteristics can specify a codec (e.g., G711), a sample rate (e.g., 8 KHz to 22 KHz), and the like. In one configuration, the speech engines 238 can be provided from a J2EE environment 236, such as a WAS environment. This environment 236 can conform to a J2EE Connector Architecture (JCA) 237.

In one embodiment, a set of additional facades 260 can be utilized on top of Web 2.0 protocols to provide additional interface and protocol 262 options (e.g., MRCP, RTSP, RTP, Session Initiation Protocol (SIP), etc.) to the Web 2.0 for voice system 230. Use of facades 260 can enable legacy access/use of the Web 2.0 for voice system 230. The facades 260 can be designed to segment the protocol 262 from underlying details so that characteristics of the facade do not bleed through to speech implementation details. Functions, such as the WAS 6.1 channel framework or a JCA container, can be used to plug-in a protocol, which is not native to the J2EE environment 236. The media component 234 of the container 231 can be used to handle media storage, delivery, and format conversions as necessary. Facades 260 can be used for asynchronous or synchronous protocols 262.

Figure 3:
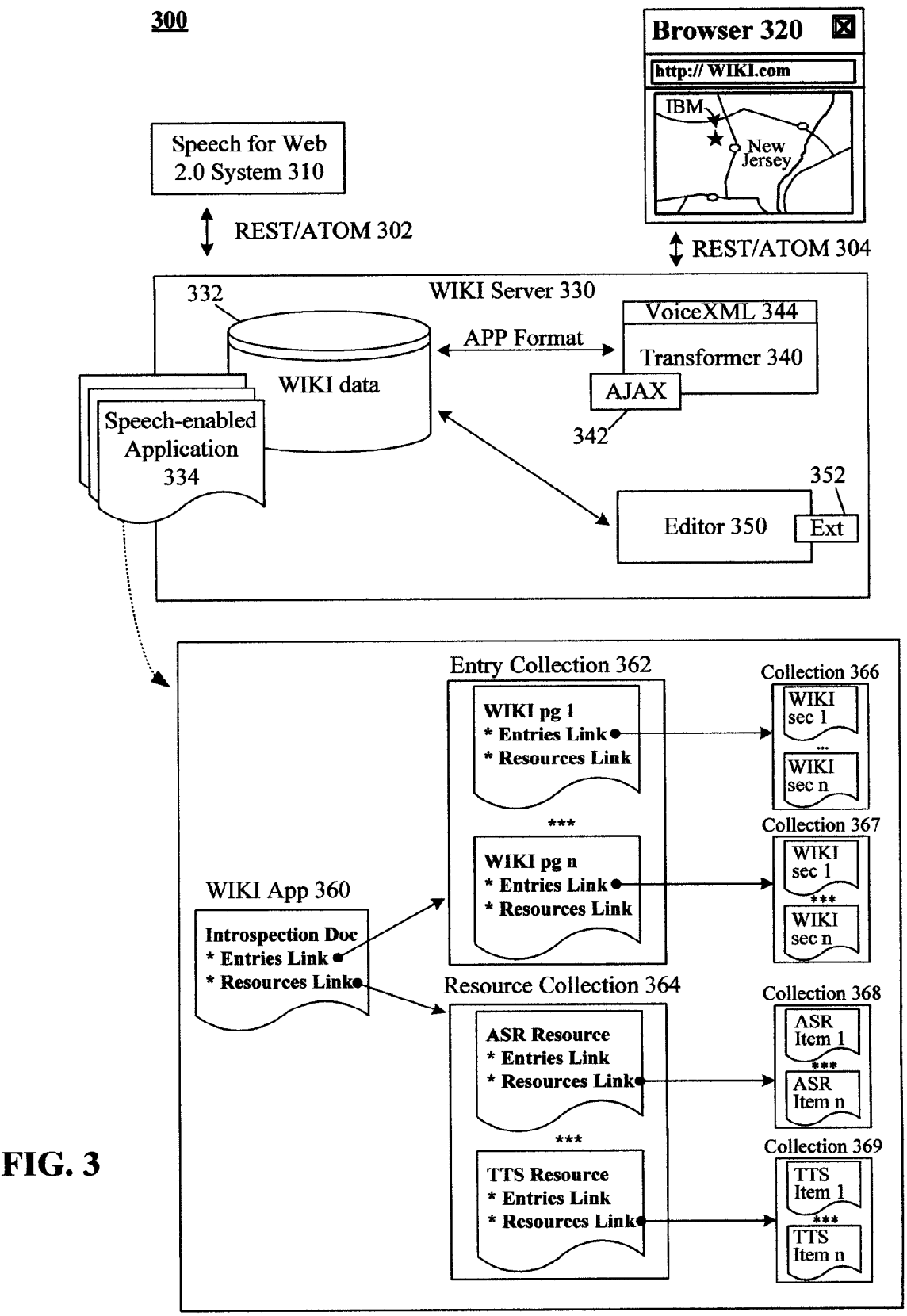
FIG. 3 is a schematic diagram showing a WIKI server adapted for communications with a Web 2.0 for voice system in accordance with an embodiment of the inventive arrangements disclosed herein.

FIG. 3 is a schematic diagram showing a WIKI server 330 adapted for communications with a Web 2.0 for voice system 310 in accordance with an embodiment of the inventive arrangements disclosed herein. The served applications 334 can be created using a voice only interface 112 of FIG. 1. Although a WIKI server 330 is illustrated, server 330 can be any WEB 2.0 server (e.g., server 114 of system 100 or server 210-214 of system 200) including, but not limited to, a BLOG server, a MASHUP server, a FOLKSONOMY server, a social networking server, and the like.

In system 300, a browser 320 can communicate with Web 2.0 server 330 via Representational State Transfer (REST) architecture/ATOM 304 based protocol. The Web 2.0 server 330 can communicate with a speech for Web 2.0 system 310 via a REST/ATOM 302 based protocol. Protocols 302, 304 can include HTTP and similar protocols that are RESTful by nature as well as an Atom Publishing Protocol (APP) or other protocol that is specifically designed to conform to REST principles.

The Web 2.0 server 330 can include a data store 332 in which applications 334, which can be speech-enabled, are stored. In one embodiment, the applications 332 can be written in a WIKI or other Web 2.0 syntax and can be stored in an APP format.

The contents of the application 332 can be accessed and modified using editor 350. The editor 350 can be a standard WIKI or other Web 2.0 editor having a voice plug-in or extensions 352. In one implementation, user-specific modifications made to the speech-enabled application 334 via the editor 350 can be stored in customization data store as a customization profile and/or a state definition. The customization profile and state definition can contain customization settings that can override entries contained within the original application 332. Customizations can be related to a particular user or set of users.

The transformer 340 can convert WIKI or other Web 2.0 syntax into standard markup for browsers. In one embodiment, the transformer 340 can be an extension of a conventional transformer that supports HTML and XML. The extended transformer 340 can be enhanced to handle JAVA SCRIPT, such as AJAX. For example, resource links of application 332 can be converted into AJAX functions by the transformer 340 having an AJAX plug-in 342. The transformer 340 can also include a VoiceXML plug-in 344, which generates VoiceXML markup for voice-only clients.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for creating and editing WIKI entries comprising:
  establishing a voice communication channel between a user and an automated response system;
  receiving user speech input over the voice communication channel;

creating a Web 2.0 entry based upon the speech input wherein the Web 2.0 entry is a WIKI entry, wherein the WIKI entry is collaborative and permits end users to edit content of the WIKI entry via functions of a WIKI server;

saving the Web 2.0 entry in a data store accessible by a Web 2.0 server wherein the Web 2.0 server is the WIKI server; and serving the saved WIKI entry to at least one WIKI client.

2. The method of claim 1, wherein the at least one WIKI client utilizes a visual browser to visually present content of the WIKI entry.

3. The method of claim 1, wherein the at least one WIKI client utilizes a voice browser to audibly present content of the WIKI entry.

4. The method of claim 1, wherein the at least one WIKI client comprises a plurality of WIKI clients, wherein at least one of the WIKI clients interfaces with the WIKI server and presents the WIKI entry via a graphical user interface (GUI), and wherein at least one of the WIKI clients interfaces with the WIKI server and presents the WIKI entry via a voice user interface (VUI).

5. The method of claim 1, wherein the voice communication channel is a real-time communication channel between the user and the automated response system that are remotely located from each other.

6. The method of claim 1, wherein the WIKI entry is stored in a Web 2.0 syntax and an ATOM PUBLISHING PROTOCOL (APP) compliant format.

7. The method of claim 1, wherein the WIKI entry is a speech-enabled Web 2.0 entry.

8. The method of claim 7, wherein the user speech input comprises a dialog prompt and a speech recognition grammar for evaluating spoken dialog prompt responses, and wherein dialog prompt and the speech recognition grammar are specified in the saved WIKI entry.

9. The method of claim 7, wherein the WIKI entry specifies at least one speech resource, which is linked to a remotely located speech engine disposed in a server-side speech processing system, said speech engine providing a speech processing capability for the speech-enabled WIKI entry.

10. A system comprising hardware and software that is stored in a non-transitory medium, wherein when the hardware is operable to execute the software causing the system to:

establish a voice communication channel between a user and an automated response system;

receive user speech input over the voice communication channel;

create a Web 2.0 entry based upon the speech input wherein the Web 2.0 entry is a WIKI entry, wherein the WIKI entry is collaborative and permits end users to edit content of the WIKI entry via functions of a WIKI server;

save the Web 2.0 entry in a data store accessible by a Web 2.0 server wherein the Web 2.0 server is the WIKI server; and serve the saved WIKI entry to at least one WIKI client.

11. The system of claim 10, comprising:

an automated response system configured to interact with remotely located users over a voice communication channel, and wherein the WIKI server is configured to serve the at least one application to remotely located clients.

12. The system of claim 11, wherein the application is a speech-enabled application, and wherein at least one of the resources is a speech resource associated with a speech engine, which adds a speech processing capability to the speech-enabled application.

13. The system of claim 11, wherein the application conforms to an ATOM PUBLICATION PROTOCOL (APP) based specification.

14. The system of claim 11, wherein the application development component is configured so that end-users are able to introspect, customize, replace, add, re-order, and remove entries and resources in the collections.

15. The system of claim 11, wherein the at least one WIKI client comprises a plurality of WIKI clients, wherein at least one of the WIKI clients interfaces with the WIKI server and presents the WIKI entry via a graphical user interface (GUI), and wherein at least one of the WIKI clients interfaces with the WIKI server and presents the WIKI entry via a voice user interface (VUI).

16. A computer program product comprising a non-transitory computer useable storage medium having computer usable program embodied therewith, wherein the computer usable program code when executed on a computer causes the computer to:

establish a voice communication channel between a user and an automated response system;

receive user speech input over the voice communication channel;

create a Web 2.0 entry based upon the speech input wherein the Web 2.0 entry is a WIKI entry, wherein the WIKI entry is collaborative and permits end users to edit content of the WIKI entry via functions of a WIKI server;

save the Web 2.0 entry in a data store accessible by a Web 2.0 server wherein the Web 2.0 server is the WIKI server; and serve the saved WIKI entry to at least one WIKI client.

* * * * *